United States Patent [19]

Eaton

[11] 4,320,907
[45] Mar. 23, 1982

[54] REMOTE CONTROL FOR NECKOVER TRAILER HITCHES

[76] Inventor: Jim N. Eaton, P.O. Box 454, Dodd St., Rodessa, La. 71069

[21] Appl. No.: 105,237

[22] Filed: Dec. 19, 1979

[51] Int. Cl.³ .............................................. B60D 1/10
[52] U.S. Cl. ................................ 280/511; 280/423 R
[58] Field of Search ............... 280/420, 504, 508, 509, 280/510, 511, 512, 513, 514, 515, 423 R; 74/501 R

[56] References Cited

U.S. PATENT DOCUMENTS

| | | | |
|---|---|---|---|
| 1,600,449 | 9/1927 | Ahlborn | 280/510 |
| 2,072,473 | 3/1937 | Baumberger | 280/512 X |
| 2,465,183 | 3/1949 | Allen | 74/501 X |
| 3,061,334 | 10/1962 | Everett et al. | 280/513 |
| 3,565,459 | 2/1971 | Reid | 280/510 X |

Primary Examiner—Joseph F. Peters, Jr.
Assistant Examiner—Randall A. Schrecengost
Attorney, Agent, or Firm—Harvey B. Jacobson

[57] ABSTRACT

Coupling and uncoupling of a vehicle trailer hitch is controlled from a safe location spaced rearwardly from and laterally of the hitch assembly between the vehicle and the forward end of the trailer through a pair of remote control actuating cables. By means of the cables extending through a curved guide tube, an operator may control a pivoted locking element and releasable latch associated with the hitch assembly.

7 Claims, 13 Drawing Figures

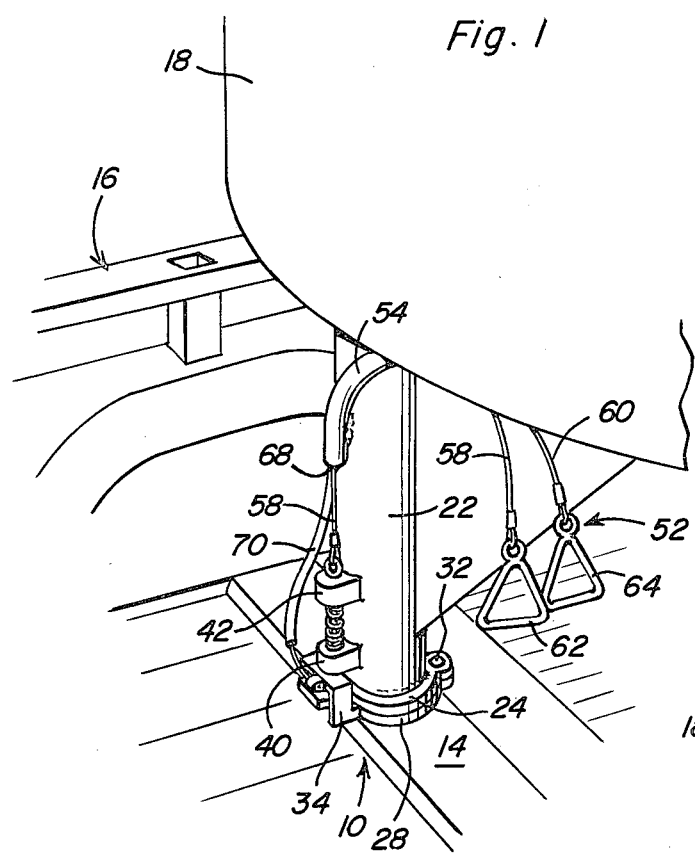
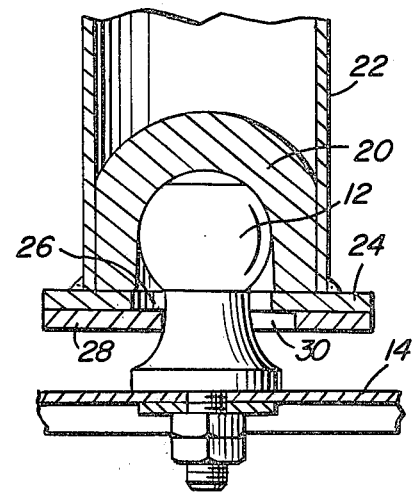
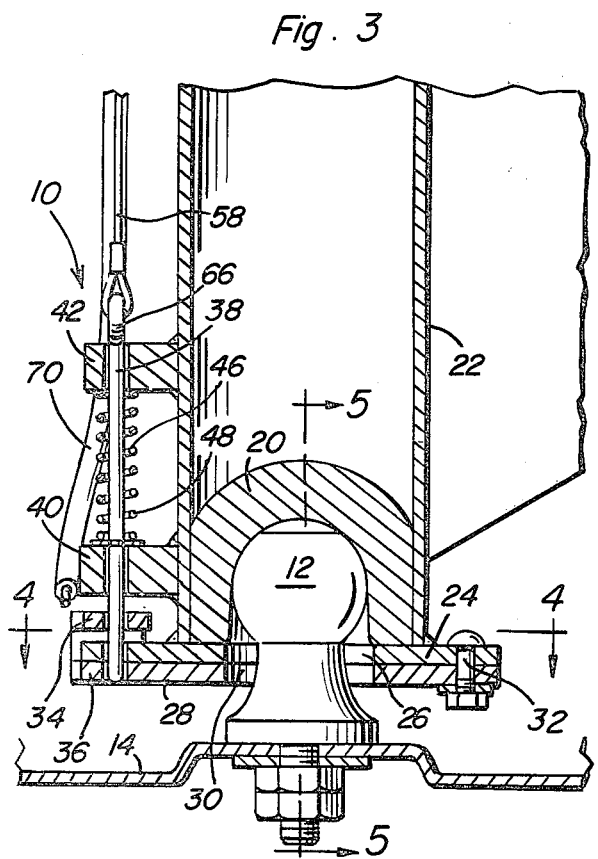
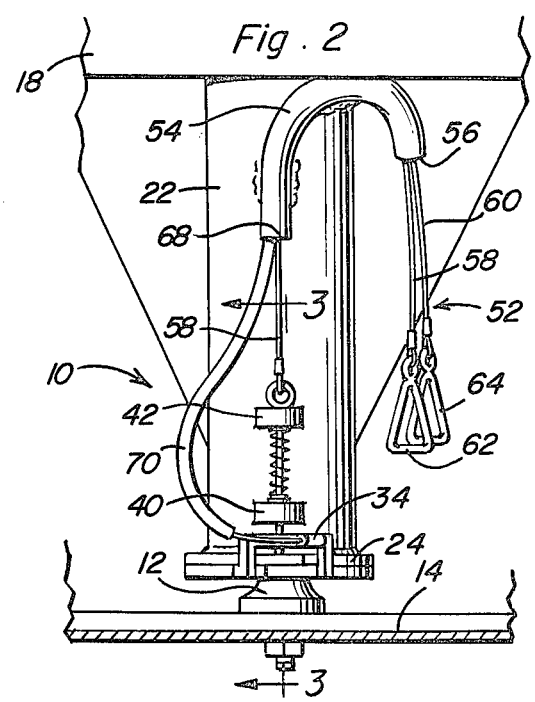
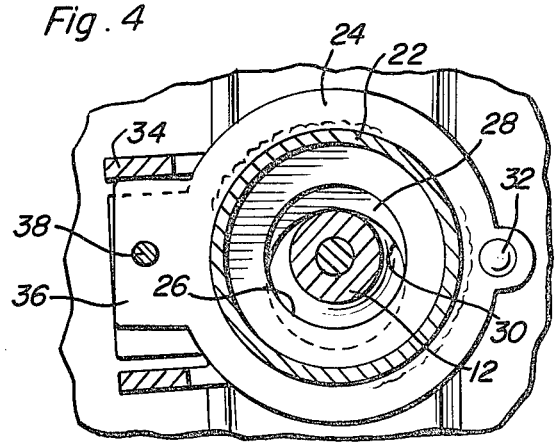

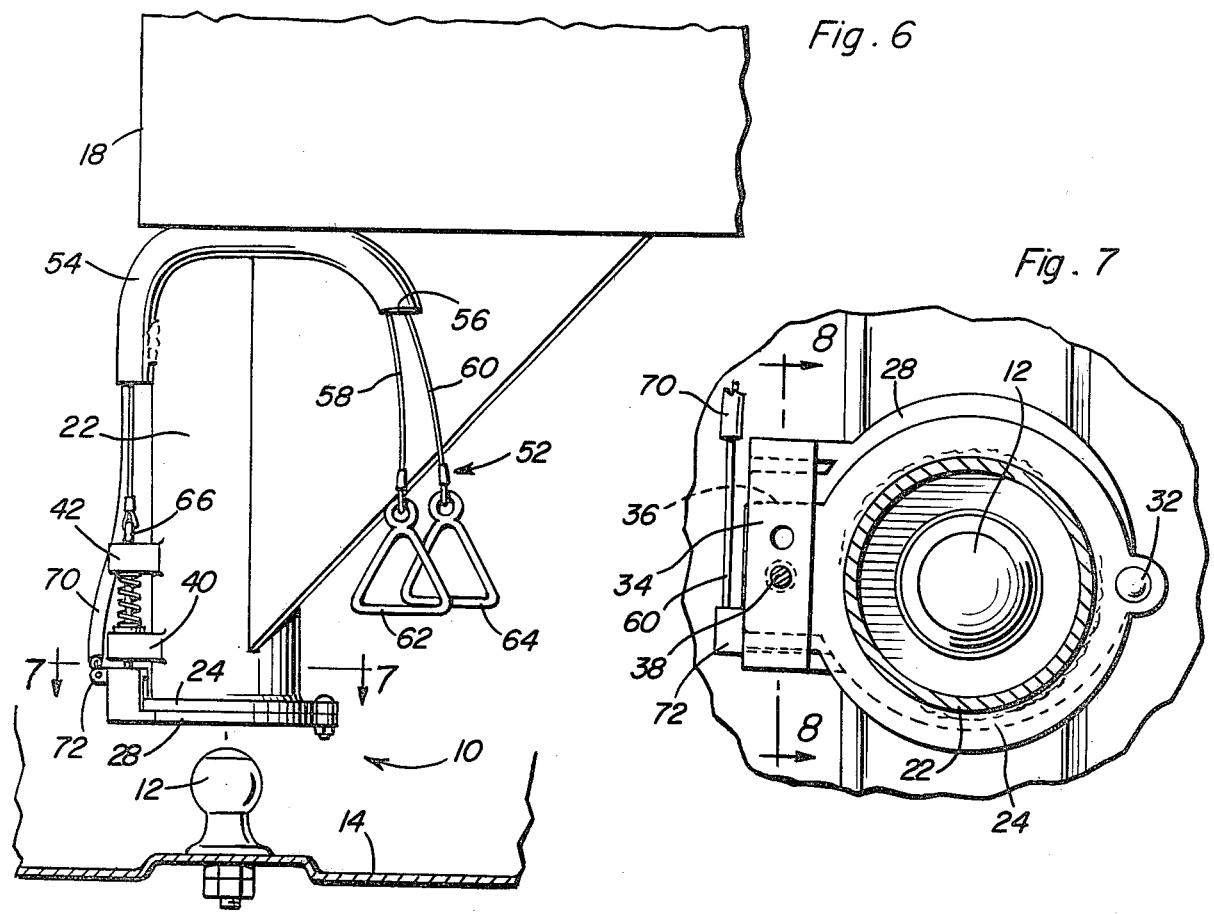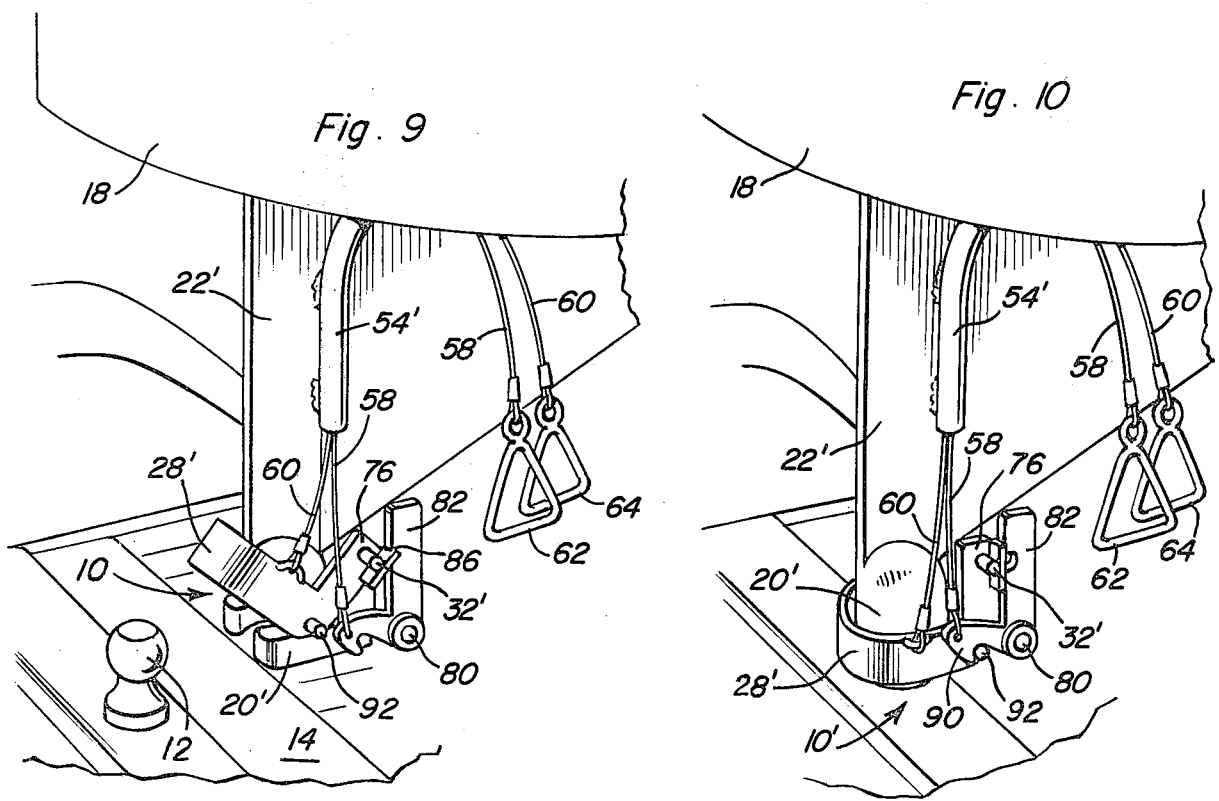

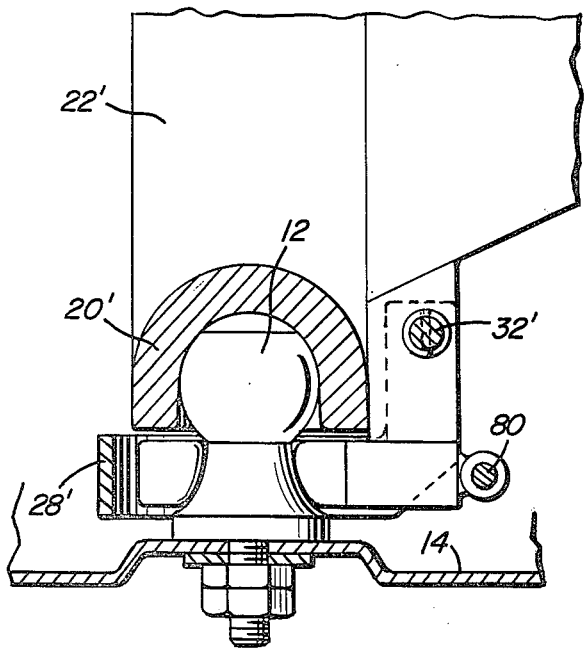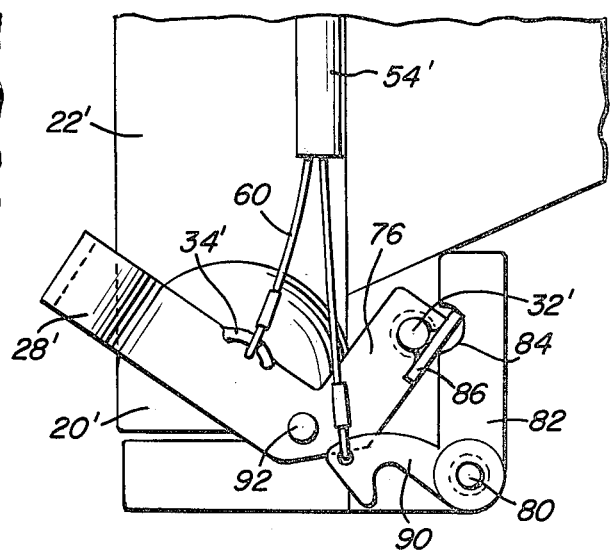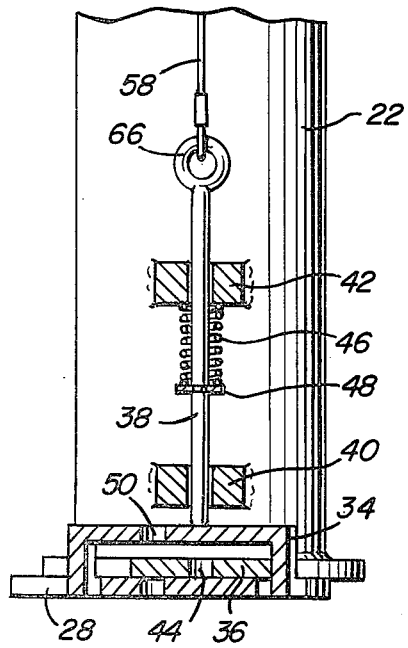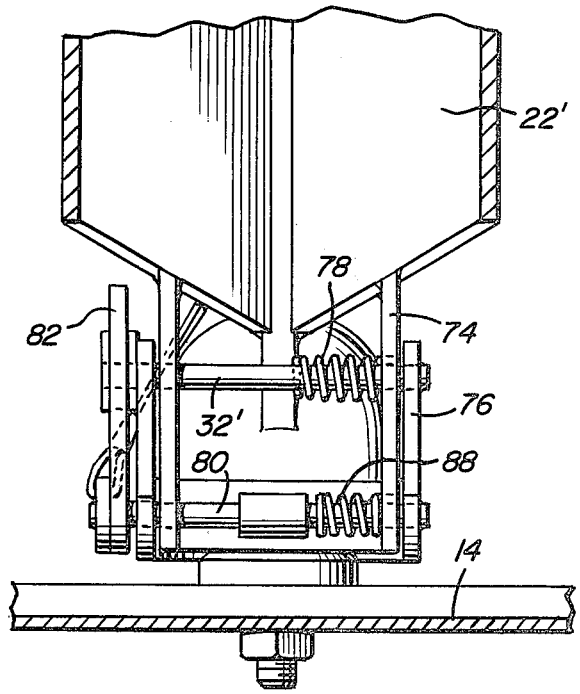

4,320,907

REMOTE CONTROL FOR NECKOVER TRAILER HITCHES

BACKGROUND OF THE INVENTION

This invention relates to vehicle trailer hitch assemblies and more particularly to a hitch control mechanism through which coupling and uncoupling of the hitch assembly is effected.

A currently popular trailer hitch is utilized for a neckover trailer that extends forwardly over a front column structure supporting a hitch socket adapted to overlie the bed of a truck vehicle at a hitch location. In order to effect a hook up, an operator heretofore mounted the truck bed to secure the hitch while engaged in verbal communication with the vehicle driver. The hitch operator was not only subjected to the discomfort of assuming an awkward position on the truck bed, but was also placed in a dangerous situation because of miscalculations and accidents that arise with respect to movement of massive bodies. Also, damage to equipment was possible because of mistakes arising from verbal misunderstandings between the hitch operator and vehicle driver and the inability of the hitch operator to react quickly from his awkward position on the truck bed.

It is, therefore, an important object of the present invention to provide apparatus for facilitating control over a trailer hitch in a safe manner.

SUMMARY OF THE INVENTION

In accordance with the present invention, a remote control assembly is provided for controlling a hitch between a vehicle and trailer through the pivoted locking element and latch holding the hitch coupling members engaged. Different types of hitch locking mechanisms may be so controlled, including eccentric plate and "auto lock" types. The hitch operator standing clear of the vehicle and trailer may thereby control the locking mechanism to effect coupling or uncoupling without mounting the vehicle. A pair of actuating cables extend through a curved guide tube from the remote control assembly, which occupies a special relationship to the hitch assembly enabling the hitch operator to exert actuating forces through the cables from a safe location to open the lock element and/or release the latch.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view showing one embodiment of a remotely controlled hitch assembly in an engaged condition.

FIG. 2 is a front elevational view of the hitch assembly shown in FIG. 1.

FIG. 3 is an enlarged partial sectional view taken substantially through a plane indicated by section line 3—3 in FIG. 2.

FIG. 4 is a partial top section view taken substantially through a plane indicated by section line 4—4 in FIG. 3.

FIG. 5 is a partial sectional view taken substantially through a plane indicated by section line 5—5 in FIG. 3.

FIG. 6 is a side elevational view of the hitch assembly of FIG. 1, in a disengaged condition.

FIG. 7 is an enlarged top sectional view taken substantially through a plane indicated by section line 7—7 in FIG. 6.

FIG. 8 is a partial sectional view taken substantially through a plane indicated by section line 8—8 in FIG. 7.

FIGS. 9 and 10 perspective views of another type of hitch assembly controlled in accordance with the present invention, in disengaged and engaged conditions, respectively.

FIG. 11 is a side sectional view taken substantially through a plane indicated by section line 11—11 in FIG. 10.

FIG. 12 is a side elevational view of the hitch corresponding to FIG. 9.

FIG. 13 is a rear sectional view taken substantially through a plane indicated by section line 13—13 in FIG. 11.

DETAILED DESCRIPTION OF PREFERRED EMBODIMENTS

Referring now to the drawings in detail, FIGS. 1 and 6 illustrate an eccentric plate type of hitch assembly 10 for a neckover trailer hitch installation with which the present invention may be associated. The hitch assembly includes a ball coupling member 12 secured to the bed 14 of a truck vehicle 16 underlying the forward end portion 18 of a trailer. The ball member is adapted to be received within a socket coupling member 20 as more clearly seen in FIG. 3, the socket member being secured to the lower end of a tubular supporting member 22 fixed to and depending from the forward end portion 18 of the trailer. Also secured as by welding to the lower end of the tubular member is a flange plate 24 having an opening 26 aligned with the socket 20. Underlying the flange plate 24, is an eccentric lock plate 28 having an opening 30 therein through which the ball member projects into the socket 20 as more clearly seen in FIG. 3. A pivot bolt 32 pivotally connects the lock plate 28 to the flange plate 24 about a pivot axis parallel to the axis of the tubular member 22 for limited displacement of the lock plate between a release or open position as shown in FIGS. 6 and 7 and a lock position as shown in FIGS. 3, 4 and 5. In the release position, the openings 26 and 30 in the plates are aligned so as to enable insertion or withdrawal of the ball member 12 relative to the socket 20. In the lock position, the opening 30 in plate 28 is eccentric to opening 26 so that the plate 28 may engage the neck portion of the ball coupling member 12 to prevent withdrawal thereof from socket 20 as more clearly seen in FIG. 5.

The lock plate 28 is pivotally displaced between the release and lock positions through a bracket member 34 secured thereto in straddling relation to a projection 36 of the flange plate 24. The projection 36 will therefore limit relative pivotal displacement of the plates in cooperation with the bracket 34 as well as to provide for latching of the plates in the lock position by means of a latching pin 38. The pin is slidably mounted on the tubular member 22 by vertically spaced guides 40 and 42, as more clearly seen in FIGS. 3 and 8, in alignment with a hole 44 in the projection 36. A spring 46 reacting between the upper guide 42 and a thrust washer 48 fixed to pin 38, biases the pin downwardly. In the release position of the plates as shown in FIG. 8, the pin 38 is held retracted from hole 44 in projection 36 by the bracket 34. When the plate 28 is in the lock position, however, hole 50 in the bracket is aligned with hole 44 so that the pin is projected by spring 46 through both holes to hold the plates in lock position as shown in FIG. 2.

In accordance with the present invention, a remote control assembly 52 is utilized to both displace the lock plate 28 between the release and lock positions and to operate the latching pin for withdrawal thereof from holes 44 and 50 against the bias of spring 46. The remote control assembly includes a curved guide tube 54 secured to the tubular member 22 in spaced relation to the hitch assembly itself. One end 56 of the guide tube is disposed rearwardly and laterally of the hitch assembly and a pair of actuator cables 58 and 60 extend therefrom having grip handles 62 and 63 attached thereto. The end of one of the cables 58 opposite its handle 62, is attached to an eye formation 66 on the upper end of the latching pin 38. The end portion 68 of the guide tube 54 therefore extends in vertical alignment with the pin 38. The other cable 60 projects from end 68 of the guide tube, sheathed in a conduit 70, and is anchored by a cable attachment 72 to the bracket 34 as more clearly seen in FIG. 7.

The hitch assembly 10 is normally in an open or disengaged condition with the lock plate 28 in the release position as shown in FIGS. 7 and 8. The trailer is positioned for hitching purposes so that the tubular member 22 is aligned above the ball coupling 12 as shown in FIG. 6. The trailer is then jacked down so as to cause the ball member 12 to enter socket 20 through the aligned openings 26 and 30 in the plates. The handle 64 is then grasped and a pull exerted on cable 60 in order to pivotally displace lock plate 28 to the lock position as shown in FIGS. 4 and 5 bringing hole 50 into alignment with hole 44. Spring 46 will then project pin 38 through the holes as shown in FIG. 3 in order to latch plate 28 in the lock position. The hitch coupling is then complete.

To unhook the hitch assembly 10, the handle 62 is grasped and a pull exerted on cable 58 retracting the latching pin 38 from holes 50 and 44. The trailer is then jacked up causing plate 28 to be displaced to its release position as the socket 20 is withdrawn from the ball 12. The truck vehicle may then be pulled away from the trailer.

FIGS. 9 and 10 illustrate another remotely controlled hitch assembly 10' for a neckover trailer hitch installation, in accordance with the present invention. The hitch assembly 10' has the same ball coupling 12 associated therewith adapted to be received in a socket 20' secured to the forward end portion 18 of the trailer by a mounting structure 22' to which a guide tube 54' is fixed. Remote actuating cables 58 and 60 also extend from the guide tube and have handles 62 and 64 attached thereto as in the case of the installation of FIGS. 1-8. The ball 12 when received in socket 20' is held therein by an arcuate keeper element 28' pivotally mounted on support structure 71, as shown in FIG. 13, by a pivot shaft 32' connected to a rear arm portion 76 of the keeper element. Cable 60 is attached by a loop 34' to the keeper element as more clearly seen in FIG. 12. A coil spring 78 as shown in FIG. 13, biases the keeper element to the locking position as shown in FIG. 10.

Also pivotally mounted on support structure 74 by means of a pivot shaft 80 is a latch element 82 having a notch 84 formed therein adapted to receive latch bar 86 to hold the keeper element 28' in its retracted position as shown in FIG. 12. The latch element 82 is biased to its latching position by a coil spring 88 on its pivot shaft 80 as shown in FIG. 13. A latching hook 90 projects forwardly from the latch element 82 and is adapted to engage a latch pin 92 on the keeper element when in the lock position as shown in FIG. 10.

With the hitch assembly 10' in the disengaged condition shown in FIG. 9, the truck vehicle may be backed up so that the ball 12 enters the socket 20'. The cable 58 is then pulled by means of handle 62 to pivotally displace the latch element 82 clockwise as viewed in FIGS. 9, 10 and 12 to a latch release position disengaging the notch 84 from the latch bar 86. The keeper element 28' will then pivot counterclockwise under the bias of spring 78 to the lock position as shown in FIG. 10. When the cable 58 is then released, the latch element 82 returns to its latching position under the bias of spring 80 causing the hook 90 to engage latch pin 92. The keeper element will then be latched in its lock position to complete the hitch coupling.

To disengage the hitch assembly 10', the operator pulls cable 58 through handle 62 to release the latch element 82 and unlatch the keeper element 28'. The other cable 60 may then be pulled through handle 64 to retract the keeper element. Once the keeper element is fully retracted, the cable 58 is released so that the latch element 82 may relatch the keeper element in its retracted position as shown in FIG. 9. Both cables 58 and 60 may then be released and the truck pulled away from the trailer.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a hitch assembly, for coupling a vehicle to a trailer, having two coupling members interengageable at a predetermined location on the vehicle, a lock element mounted on one of said members and displaceable to a locking position preventing disengagement of the coupling members, and latch means for holding the lock element in said locking position, a pair of actuating cables respectively connected to the lock element and the latch means, grip means connected to said cables for exerting control forces on the lock element and the latch means, guide means through which the cables extend for locating the grip means in remote spaced relation to said location on the vehicle, and a mounting structure depending from a forward end of the trailer to which one of the coupling members is secured, said guide means comprising a curved guide tube secured to the mounting structure and having fixed opposite end portions from which the cables extend toward the coupling members and the grip means, respectively.

2. The combination of claim 1 wherein one of the fixed end portions of the guide tube extends in a vertical direction and the other of the fixed end portions projects horizontally and laterally therefrom.

3. The combination of claim 2 wherein one of the coupling members is a ball element secured to the vehicle and the other of the coupling members is a socket element secured to the trailer by the mounting structure in vertically spaced relation below said one of the end portions of the guide tube.

4. The combination of claim 3 wherein said mounting structure below the socket element is a tubular member having a vertical axis, said lock element comprising a plate pivotally connected to the mounting structure at a pivot axis parallel to said vertical axis and having an opening through which the ball element is inserted into the socket element.

5. The combination of claim 4 wherein said latch means comprises a vertically displaceable pin biased into engagement with the lock element in said locking position.

6. The combination of claim 3 wherein said lock element is a keeper pivotally connected to the mounting structure and displaceable between said locking position and a retracted position, said latch means being engageable with the keeper for releasably holding the same in both of said locking and retracted positions.

7. In combination with a hitch assembly, for coupling a vehicle to a trailer, having two coupling members interengagable at a predetermined location along a longitudinal axis of the vehicle, a lock element mounted on one of said members and displaceable to a locking position preventing disengagement of the coupling members, and latch means for holding the lock element in said locking position, the improvement residing in remote control means connected to the lock element and the latch means for coupling and uncoupling the hitch assembly, and guide means through which the remote control means extends from the hitch assembly longitudinally and laterally of said location along the axis of the vehicle, said guide means comprising a curved guide tube fixed to the trailer and having fixed opposite end portions, one of the fixed end portions extending vertically above the interengaged coupling members, the other of the fixed end portions projecting rearwardly and laterally therefrom.

* * * * *